Nov. 5, 1940.  E. L. MAYO  2,220,607

CIGAR LIGHTER FOR AUTOMOTIVE VEHICLES

Filed Jan. 9, 1937

INVENTOR.
EDWARD L. MAYO.
BY Stough and Canfield
His ATTORNEYs.

Patented Nov. 5, 1940

2,220,607

UNITED STATES PATENT OFFICE 2,220,607

CIGAR LIGHTER FOR AUTOMOTIVE VEHICLES

Edward L. Mayo, Cleveland, Ohio

Application January 9, 1937, Serial No. 119,743

4 Claims. (Cl. 219—32)

My invention relates to cigar lighters, and relates more particularly to that class of lighters employed for the lighting of cigars and cigarettes through the energization of an electrical heating element.

More particularly, my invention relates to cigar and cigarette lighters of the type comprising a lighter plug body which is adapted to be removably inserted into a socket holder which may be placed on the instrument panel of an automobile or other suitable support, and comprising a cigar and cigarette lighting electrical heating element at one end which ordinarily is disassociated with a source of electrical current for energizing it, but which by manual effort exerted upon the lighting plug will effect an electrical connection between contacts of the plug and contacts of the socket to energize the heating element which is thus, by the flow of electrical current through the element of the plug, caused to be heated to a red heat, whereupon the operator may withdraw the plug entirely from the socket, and when thus disassociated from the socket the heating element will remain sufficiently hot for a sufficiently long period that it may be employed to light cigars and cigarettes, the ends of which are pressed into contact with the heating element at one open end of the plug.

The heating storage capacity of the element in such devices is made of a sufficiently high value that the element will retain heat long enough to light several cigars in succession with a single energization of the heating element.

Lighters of this general type are well known, and it is therefore a principal object of my invention to further improve the well known heating elements of the above general type.

Another object of my invention is to provide an improved device of this kind whereby the heating element may be more quickly heated without such rapid heating being destructive of the element than previously has been found practical.

Another object of my invention is to provide an improved device of the class above referred to, wherein automatic means are provided for automatically discontinuing energization of the heating element as soon as the heating element has achieved a predetermined temperature.

Another object of my invention is to provide improved means for indicating visually at the handle end of the lighter plug when the heating element has achieved its ultimate degree of temperature to condition it for lighting cigarettes.

Another object of my invention is to provide a device of the class above referred to which may be manufactured at relatively low cost and at the same time will be highly efficient in use and which will quickly achieve cigar and cigarette lighting temperatures in the heating element portion of the device, without liability to early destruction of said element.

Other objects of my invention and the invention itself will become readily apparent to those skilled in the art to which my invention appertains by reference to the accompanying specification of a preferred embodiment of my invention, and in which reference is had to the accompanying drawing illustrating the said embodiment.

Referring to the drawing.

Figure 2:
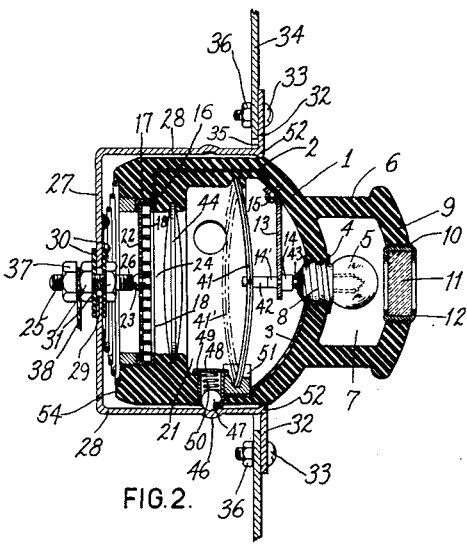
Fig. 2 illustrates the plug and socket of Fig. 1, both in diametrical sectional view, with the plug fully inserted in the socket.
Figure 3:
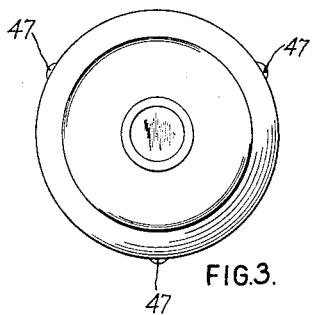
Fig. 3 is a front elevational view of the plug of the foregoing figures.
Figure 4:
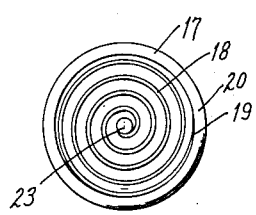
Fig. 4 is an end elevational view of the heating element illustrated in Fig. 2 in cross-section, the view being taken from the interior of the plug relative to the heating element.
Figure 5:
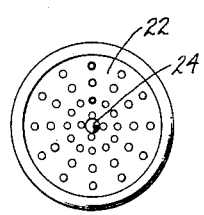
Fig. 5 illustrates an end elevational view of the heating element of Fig. 4.
Figure 6:
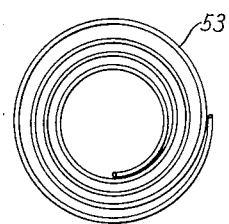
Fig. 6 is a view of a spring disposed within and preferably attached to the socket portion of the said device.

Referring now to the foregoing figures of drawing, and referring more particularly to Fig. 2, at 1 I show the lighter plug casing which preferably is molded of Bakelite or other phenolic condensation material with certain electrical conductor parts molded in the body of such material, which material has electrical insulating properties.

The said electrical conductor portions molded in the insulating body 1 are the connector straps 2 and 3, the strap 3 terminating at 4 in an internally threaded tubular electric lamp receiving socket, the lamp therefor, which is removably insertible in said lamp socket, being shown at 5.

The casing comprising a handle end portion 6 providing a chamber 7 within which the lamp 5 is disposed with its stem 8 screw-threaded into the lamp socket 4 and the end wall 9 of said handle portion is apertured at its center at 10 for the reception of a glass or other like window lens 11 which is encased within a metallic tubular externally threaded frame 12, which is retained in screw-threaded engagement with the cooperatively threaded walls of the aperture 10.

The body 1 comprises a second or main chamber 21 within which is placed a contact leaf spring 13 carrying contacts 14 and 14' on the two sides of its free end, and is secured at 15 to a wall of the said main chamber and at 15 also the spring 13 makes electrical connection with the connector strap 2, which forms a connection at 16 with the outer terminal 17 of the electrical heating element 18. The electrical heating element 18, while it may be made in any suitable manner well known in the art, is illustrated in the present embodiment as comprising a spirally wound resistance wire which is connected at its outer end 19 to the heater element frame 20 which is annular in form and comprises inwardly turned flanges between which the heating element as a whole is clamped.

The resistance wire 18 is disposed on that side of the heating element which faces the interior of the said second or main body chamber 21, this being herein referred to as the inner face of the heating element. The outer face of the heating element is supplied with a perforated piece of mica or like refractory electrically insulating material, shown at 22, the said mica being in the form of a disc and is applied to the outer face of the spiral resistance wire 18, a portion of the outer convolutions of the wire 18 being engaged with the inner flange of the annular flanged clamping frame 20, and the heating element, and said mica disc being clamped together between the two flanges of the annular frame 20.

A contact headed rivet 23 passes through an aligned central perforation of the mica disc 22 and the innermost convolution of the resistance wire 18, so as to mechanically secure the mica disc and the center of the resistance wire unit together, said rivet 23 being headed at both ends, the innermost head being shown at 24, and the outermost head 23 being an electrical contact and made of some such material as a mixture of platinum and silver, or the like.

At 25 I show a contact screw carrying a contact 26 on its inner end, for engagement with the contact 23 secured to the heating element, the said contact screw being carried by the end wall 27 of a plug receiving socket which is illustrated at 28, and passing through an opening 29 through said wall 27, the diameter of the said opening being substantially larger than the diameter of the screw 25 projected therethrough, so that no electrical contact will be had between the said screw and the walls of the opening.

A pair of insulating washers 30 are interposed between the wall 27 of the plug receiving socket and a pair of securing nuts 31 which are screw-threaded onto the screw 25 to securely clamp said washers 30 against the two sides of the socket wall 27, and thereby to retain the contact screw 25 on said wall with its end projecting axially inwardly of the socket 28, whereby its contact 26 carried at its end is adapted to engage the contact 23 of the heating element, previously described, when the plug body 1 is forced into the socket to the extent indicated in Fig. 2.

The socket 28 comprises a central cup-shaped portion having an end wall 27 and substantially cylindrical side walls, and a radial flange 32 whereby, by means of screws 33, the socket may be securely carried on a suitable support such as the instrument board plate 34 of an automobile, and which is apertured as at 35 to permit the projection of the said socket through the aperture of the plate 34, and is securely held in place by the screws 33 which are suitably supplied on the inner side of the plate 34 with securing nuts 36.

Figure 7:
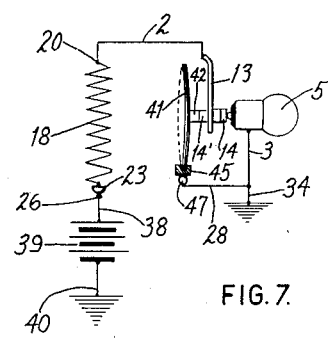
Fig. 7 is a schematic view of the electrical circuit connections involved in the operation of my improved lighter mechanism.

An additional nut 37 is preferably provided for the screw 25 at its outer end, whereby a circuit conductor wire 38 is clamped to the said contact screw 25 in order to make an electrical connection between a source of electrical current such as the battery 39, Fig. 7, to the contact 26, and thence through the contact 23 to the heating element 18 at the central inner terminal thereof. The connection to the other terminal of the battery 39 is made through the frame 34 of the instrument board, which is metallically connected to the metal frame of the automobile, in the usual manner, whereby it is only necessary to "ground" the battery 39 to the frame of the automobile, as indicated at 40, in order that battery current may be supplied to the electrical parts of the plug 1.

At 41 I show a bi-metallic thermally warpable disc in one of two alternatively warped positions or forms, and at 41' I show it in the other alternative warped position or form, and for the purpose of this part of the description it is stated that this is a commercially well known article commonly called a Spencer disc having its circumferential edges constrained against expansion and that when the disc is exposed to normal ambient temperatures it takes the form shown at 41 by solid lines, and when exposed to higher temperatures takes the alternatively warped form shown by dotted lines at 41'. The disc would ordinarily be substantially thinner than as illustrated, due to the inability of a draftsman to show it according to correct dimensions.

The thermostatic disc 41 carries at its center an electrical contact element 42 which, in the position and form of the element 41 shown, would make contact with the contact 14' carried by the leaf spring 13, the contact 14 of which leaf spring is at the same time in contact with the end contact 43 of the electric lamp 5.

In the above plug, I preferably provide a refractive lens 44 interposed between the heating element 18 and the thermostatic disc 41 in order to concentrate radiant heat rays evolved by the heating element 18 upon the more active central portion of the thermostatic disc 41. However, the lens 44 may ordinarily be omitted, and it will be understood that the disclosure of the drawing is to be taken both as omitting the lens 44, and as containing the lens 44, in alternative embodiments, and Fig. 2 is to be considered both ways in the alternative as showing the structure of my improved device, whether or not it contains such a lens 44.

The otherwise cylindrical side walls of the socket element 28 are outwardly bulged to form an annular ball receiving channel at 46, whereby when the plug 1 is inserted as far as it will go, as illustrated in Fig. 2, the three spring pressed balls 47 will enter the annular channel provided by the outwardly bulged wall portion 46. The balls 47 are each projected within a cartridge-like container 48 having an upper end flange 49 and a generally cylindrical chamber in which is placed a helical spring 50, the spring 50 being interposed between the balls 47 and the end wall of the ball containers 48. The mouths of the containers 48 are more restricted by inturning the edges of the side walls of the containers, so that at the mouths the edges of the containers are projected inwardly to make the mouths of a substantially less diameter than the diameter of the balls 47, but permitting a portion of each of the balls 47 to project outwardly from the mouths of the cartridge-containers 48, and it is the projecting portions of said balls 47 that are adapted to enter the said annular channel of the plug socket.

The balls perform the function of yieldingly restraining dislodgment of the plug from its innermost position with respect to its socket when the plug has been pressed to such innermost position, as illustrated in Fig. 2, and a certain amount of manually exerted pulling force will have to be applied to the plug by the handle portion 6 in order to remove the plug from such a position. In such position, as has been stated, contact is made between the contact screw 25 and the contact 23 of the heating element.

The balls 47 also perform a function in completing the electric circuit, both of the heating element 18 and the lamp 5, since the balls 47 through the spring 50 and containers 48 are electrically connected to the annular shoulder 51, which supports the thermostatic disc 41 and to the electrical conducting strap 3 which leads therefrom, to the threaded outer terminal 8 of the lamp 5. It is perhaps to be explained that the annular element 51 has a radially inwardly disposed surface comprising an annular groove into which the edges of the disc 41 are projected, said channel having divergent side walls to permit the thermostatic disc to rock from its one illustrated warped form and position to its alternatively warped position and form, as indicated by the dotted line showing of the disc 41'.

Figure 1:
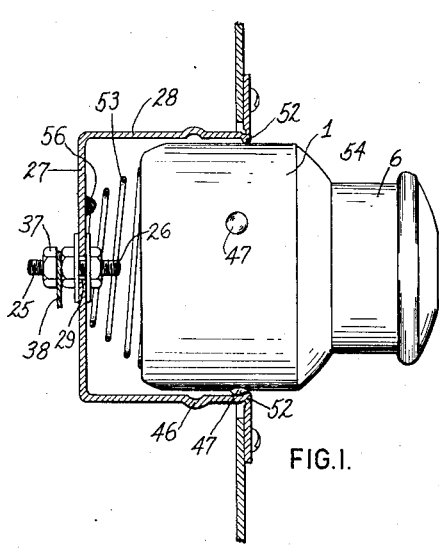
Fig. 1 illustrates an embodiment of my invention comprising a lighting plug shown in side elevational view and a transverse sectional view of a socket element cooperative therewith.

The balls 46, also, in another alternate position of the plug illustrated in Fig. 1, wherein the plug is inserted to a less extent within the socket 28 than as shown in Fig. 2, engage the inwardly projecting annular shoulder 52, which is formed at the mouth of the socket element 28 to prevent loss of the plug by vibration or accidental striking by extraneous objects, although when a distinct manually effected pulling force is exerted upon the handle portion 6 of the plug to remove the plug from the socket, the balls will ride over the shoulder 52 against the pressure of the springs 50, and upon reinserting the plug the balls will also ride over the shoulder, in the same way. However, the balls pressing against the inner surface of the side walls of the socket 28, will effect a friction retardation which will hold the plug from displacement.

When the plug is replaced in the socket 28, the effect of an opposing spring 53 is noticed by the operator as the plug will not readily move inwardly to its extreme position as shown in Fig. 2 except by a considerable inwardly directed manually effected effort, and therefore when, after use of the lighter, the plug is reinserted in the socket without this additional extra heavy pressure, it will take the position as shown in Fig. 1.

In the operation of the lighter of my invention, assuming the parts are in the position shown in Fig. 1, and the user of the lighter desires to have the heating element energized whereby to light a cigar or cigarette, he grasps the handle portion 6 and then presses inwardly on the plug, his fingers applying pressure against the inclined shoulder of the plug, and when sufficient pressure is exerted to overcome the opposing pressure of the spring 53 which is interposed between the end wall 27 of the socket and the end surface 54 of the plug, which is preferably slightly recessed to receive the end convolution of the spring, the operator may press the plug inwardly to the position illustrated in Fig. 2, whereupon the electrical contact 26 at the end of the contact screw 25 will engage the contact 23 of the heating element 18 and current will flow between the contacts 26 and 23 from the battery 39 (see Fig. 7), through the heating element 18 and thence through the conductor to the spring 13, contacts 14' and 42, through the bi-metallic element 41, the balls 47, to the frame 28 of the socket element, returning to the opposite side of the battery through the frame 34 which, as has been stated, is permanently connected to the ground side of the battery 39.

With the circuit in this condition, the lamp 5 will not be lighted because of being short-circuited by the bi-metallic element 41, and the heating element 18 will receive full battery current and will rapidly achieve maximum heat. As it approaches maximum heat, heat communicated from the heating element to the interior of the main plug chamber 21 will heat the bi-metallic disc 41 which, in the well known manner, comprises, as shown on its concave side, a disc of less thermally expansible metal than on its convex side, as shown, and therefore the disc, being heated, will reverse its form to the dotted line form shown at 41', this being accomplished by a characteristic "snap-action" and when this occurs the contacts 14' and 42 will be separated, breaking the short-circuit around the lamp 5 which subsequently will be included in serial circuit across the battery 39 together with the heating element 18.

The electrical resistance of the filament of the lamp is so much greater than the resistance of the heating element 18 that the lamp will be lighted by current through the heating element, but the heating element will not be sufficiently energized by the small amount of current flowing through the lamp 5 and the heating element will start to cool. The heating element, however, has sufficient heat storage capacity that it will remain near maximum heat for an appreciable length of time and therefore the user of the lighter, seeing the lamp 5 lighted, will know that the lighter is ready for use and will manually withdraw the plug from the socket and apply the end of the cigar or cigarette desired to be ignited to the mica facing 22 of the heating element and the mica facing, being heated to red heat by the heating element immediately in contact with it, will communicate sufficient heat to the cigar to light it, and this heat will be retained long enough for the user of the lighter to pass it to other users in turn until sufficient time has elapsed for the heating element to lose its heat, whereupon the plug is replaced in the socket to the position shown in Fig. 1, and it is retained in that position by the balls 47 engaging the shoulder 52 and being pressed thereagainst by the spring 53.

The spring 53 is held within the socket by having its end convolution soldered as at 56 to the end walls 27 of the socket, or is secured thereto in any suitable way, so that it will be retained in readiness to oppose the insertion of the plug in the socket at a subsequent operation, as described.

Having thus described my invention in one embodiment, I am well aware that numerous other embodiments may now readily be devised incor- porating the spirit of my invention and employing the same elements in other forms or equivalent elements.

I claim as my invention:

1. A lighter of the class described comprising a pair of relatively telescopable members, one being a lighter plug and the other a plug receiving socket, said plug adapted to be removably inserted into said socket, said plug comprising an electrical heating element presented from one end of the plug and signal means visible from the other end thereof, co-operating electrical contacts on said members for establishing an electrical circuit between an extraneous source of electrical current and said element to energize said element when said plug and socket are in a relatively telescoped relation, heat responsive means associated with one of said members responsive to accrued temperature of said element, to substantially interrupt the current flow therethrough, said signal means operable responsive to the operation of said heat responsive means to indicate the accrued temperature condition, yieldable detent means comprising lateral opposing portions of both said members for yieldingly retaining said members in either of two different relatively telescoped positions, said contacts operable in one of said positions and disabled in another of said positions.

2. A lighter of the class described comprising a pair of relatively telescopable members, one being a lighter plug and the other a plug receiving socket, said plug adapted to be removably inserted into said socket, said plug comprising an electrical heating element presented from one end of the plug and signal means visible from the other end thereof, co-operating electrical contacts on said members for establishing an electrical circuit between an extraneous source of electrical current and said element to energize said element when said plug and socket are in a relatively telescoped relation, heat responsive means associated with one of said members responsive to accrued temperature of said element, to substantially interrupt the current flow therethrough, said signal means operable responsive to the operation of said heat responsive means to indicate the accrued temperature condition, yieldable detent means comprising lateral opposing portions of both said members for yieldingly retaining said members in either of two different relatively telescoped positions, said contacts operable in one of said positions and disabled in another of said positions, said detent means comprising spring pressed portions of one of said elements and shoulder portions of the other element.

3. A lighter of the class described comprising a pair of relatively telescopable members, one being a lighter plug and the other a plug receiving socket, said plug being adapted to be removably inserted into said socket, said plug comprising an electrical heating element presented from one end of the plug and signal means from the other end thereof, cooperating electrical contacts on said members to establish an electrical circuit between an external source of electrical current and said element to energize the element when said plug and socket are in relatively telescoped relation, heat responsive means associated with one of said members movably responsive to the accrued temperature of said element, to substantially interrupt the current flow therethrough, said signal means operably responsive to the operation of said heat responsive means to indicate the accrued temperature condition, yieldable detent means comprising lateral opposing portions of both said members to yieldingly retain said members in either of two different relatively telescoped positions, said contacts operable in one of said positions and disabled in another of said positions, and spring means opposing relative movement of the contacts from a disabled position to an engaged position.

4. A lighter of the class described, comprising a pair of relatively telescopable members, one being a lighter plug and the other a plug receiving socket, said plug adapted to be removably inserted into said socket, said plug comprising a generally tubular body formed of electrical insulating material, a heating element including a contact presented from one end of the plug, a handle for the plug having a transparent portion, a bulb mounted in the handle portion, cooperating electrical contacts associated with the socket and plug for supplying electrical current from an external source, a heat responsive element connected in series with the heating element and in parallel with the bulb, said heat responsive element being operably responsive to accrued temperature to interrupt current flow through the heating element whereby the bulb will be illuminated to indicate the temperature condition, and yieldable means comprising lateral opposing portions of both said members for yieldingly retaining said members in either of two different relatively telescoped positions, said contacts operable in one of said positions and disabled in another of said positions.

EDWARD L. MAYO.